(12) United States Patent
Sudou et al.

(10) Patent No.: US 6,556,405 B2
(45) Date of Patent: Apr. 29, 2003

(54) PROGRAMMABLE CONTROLLER

(75) Inventors: Eiichi Sudou, Kitakanbara (JP);
Kazunori Umeda, Tokyo (JP);
Masayuki Wada, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/761,183

(22) Filed: Jan. 18, 2001

(65) Prior Publication Data

US 2001/0009493 A1 Jul. 26, 2001

(30) Foreign Application Priority Data

Jan. 20, 2000 (JP) .................................. 2000-014149

(51) Int. Cl.[7] .............................................. H02H 3/00
(52) U.S. Cl. ............................ 361/93.7; 361/85; 361/87
(58) Field of Search .................... 361/85, 87, 93.1–93.9

(56) References Cited

U.S. PATENT DOCUMENTS 5,875,087 A * 2/1999 Spencer et al. ............... 361/87

OTHER PUBLICATIONS

PCIM'88 Proceedings p. 35.
Warren Schultz, Motorola, SPS Lossless Current sensing with Sensefets Enhances Motor Drive Design (Cover Sheet).

* cited by examiner

*Primary Examiner*—Stephen W. Jackson
(74) *Attorney, Agent, or Firm*—Antonelli, Terry, Stout & Kraus, LLP

(57) ABSTRACT

A programmable controller has an overcurrent detection portion, an overcurrent indication portion and a transistor for interrupting a load current at the time of occurrence of an overcurrent are provided in an output circuit portion of the programmable controlled. An overcurrent detection resistor is provided in the output transistor circuit, and a detected voltage across the resistor is compared with a reference voltage in an overcurrent detection circuit to judge an overcurrent. If an overcurrent is recognized, the overcurrent indication portion is operated, and the base current of the output transistor circuit is controlled to perform protection of the output circuit from the overcurrent. Accordingly, when an overcurrent is flowing and an input signal is in ON state, the output transistor is turned OFF automatically and, the overcurrent state is showed to a user.

4 Claims, 5 Drawing Sheets

PROGRAMMABLE CONTROLLER

BACKGROUND OF THE INVENTION

The present invention relates to a programmable controller in which overcurrent protection of an output circuit is attained by a simple circuit configuration with general-purpose parts.

The background art will be described by using a circuit shown in FIG. 2. FIG. 2 shows an overcurrent detection circuit of an output circuit of a background-art programmable controller using a Kelvin terminal.

The reference numeral 1 represents a collector terminal of a dedicated IC having a Kelvin terminal; 2, an output terminal; 3, a Kelvin terminal for detecting an overcurrent; 4, an overcurrent detection resistor; 5, a base terminal; and 6, a load. First, when a current for operating the output circuit flows into the base terminal 5, an output current flows from the collector terminal 1 to the output terminal 2. Assume that the load 6 has turned low in resistance for some reason, for example, short circuit. Since the maximum output current is set to be up to 1 A in this output circuit, there is a fear that the output circuit is broken due to overcurrent if a current of over 1 A flows therein. There is another fear that the load 6 connected to the output terminal 2 is broken due to overcurrent. To prevent these fears from occurring, the following solution has been performed. That is, a voltage generated in the overcurrent detection terminal 3 is detected to interrupt a current flowing in the base terminal 5 before the current ends in overcurrent. The output current is thus interrupted so that the load 6 is protected from overcurrent.

In addition, in such a background-art circuit, it is not easy to identify the condition that an overcurrent is flowing in the output terminal 2. Although a method in which an ammeter is mounted in series with the load 6 to identify an overcurrent can be considered, the configuration becomes complicated and it is difficult to mount the ammeter after an overcurrent has occurred.

In addition, a background-art apparatus uses a part in which such a circuit has been integrated into a dedicated IC. Accordingly, such a part is very expensive. In addition, the maximum output current which is allowed to flow in the IC is fixed so that there causes inconvenience that a circuit having an output current larger than the maximum output current cannot be used.

A background-art programmable controller has been apt to be not only expensive but also inconvenient to use because a dedicated IC having an overcurrent detection function is used in an output circuit portion of the programmable controller.

SUMMARY OF THE INVENTION

It is an object of the present invention to provide a programmable controller which is constituted in combination of general-purpose parts so that overcurrent protection of an output circuit can be attained without increasing the cost.

According to the present invention, a programmable controller comprises a power source module, a CPU module, an input module and an output module, wherein the programmable controller further comprises an output circuit portion provided in the output module, a current detection portion for detecting a current flowing in the output circuit portion, an overcurrent control circuit portion for supplying an interruption signal to the output circuit portion when a detected current value exceeds a predetermined value, and an overcurrent indication portion for operating synchronously with the interruption signal, the output circuit portion interrupting an overcurrent at the time of an overcurrent and making the overcurrent indication portion indicate overcurrent interruption.

In addition, according to the present invention, a programmable controller comprises a power source module, a CPU module, an input module and an output module, wherein the programmable controller further comprises an output transistor provided in the output module, a current detection portion provided in a load current path of the output transistor, a comparator circuit for comparing a voltage detected by the current detection portion with a predetermined voltage, a control circuit for interrupting current conduction of the output transistor when the comparator circuit generates an output at the time of the presence of a signal instructing current conduction to the output transistor, and an overcurrent indication portion connected to the control circuit for indicating interruption of current conduction of the output transistor.

DETAILED DESCRIPTION OF THE EMBODIMENT

An embodiment of the present invention will be described below specifically with reference to the drawings.

Figure 5:
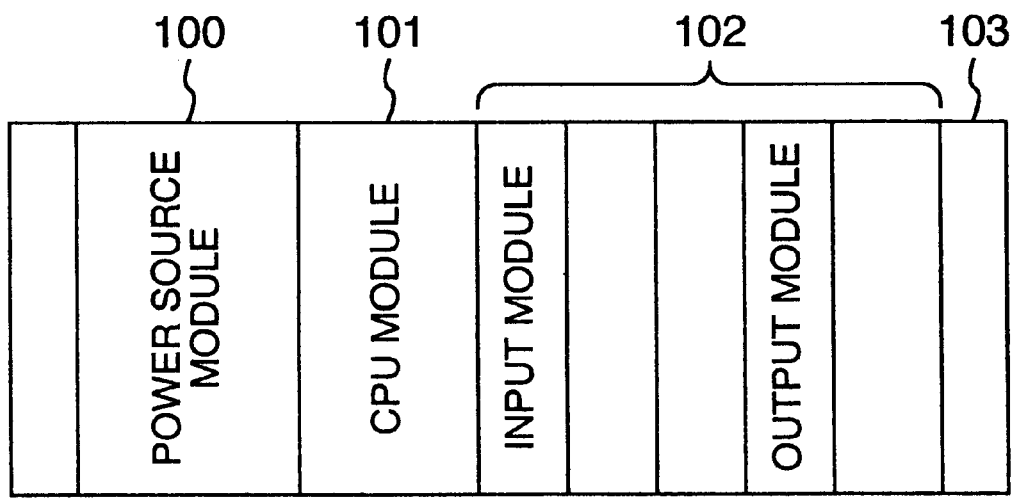
FIG. 5 is a schematic view of a programmable controller according to the present invention.

FIG. 5 schematically shows the whole configuration of a programmable controller. A power source module 100, a CPU module 101 and a plurality of input and output modules 102 are attached to a mounting base 103. The CPU module 101 is configured to receive an input from an input module in accordance with the content of a user program, perform a required operation, and control an output supplied to an output module.

Figure 1:
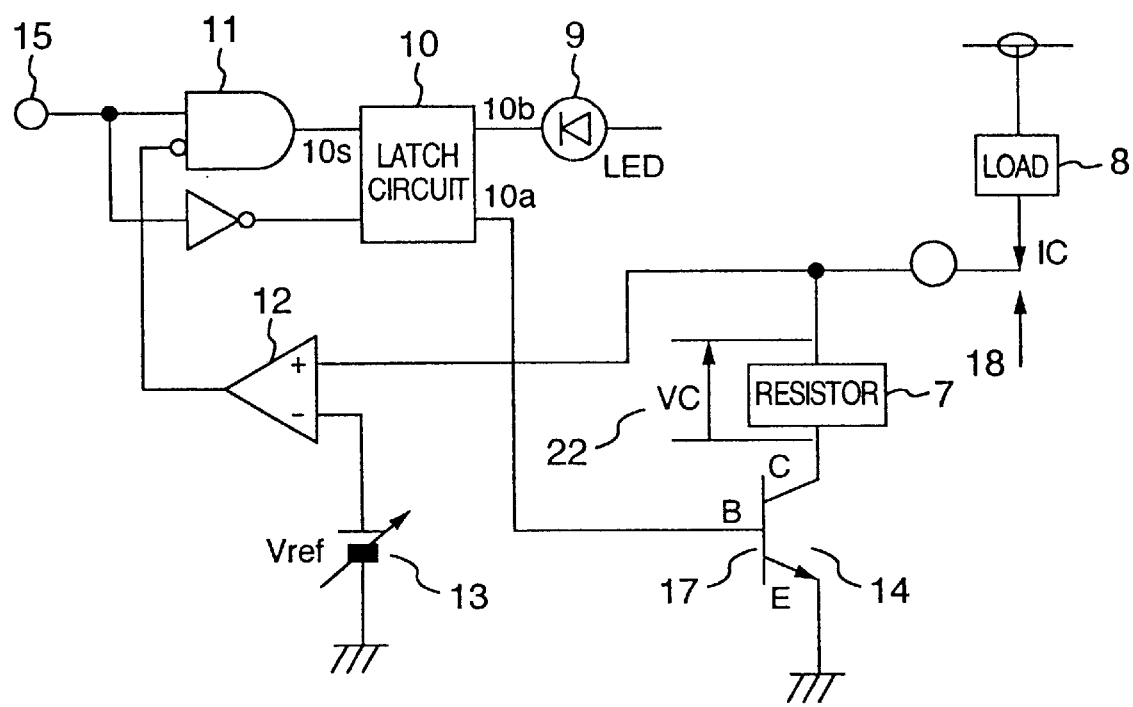
FIG. 1 is a circuit diagram showing an embodiment of the present invention.
Figure 2:
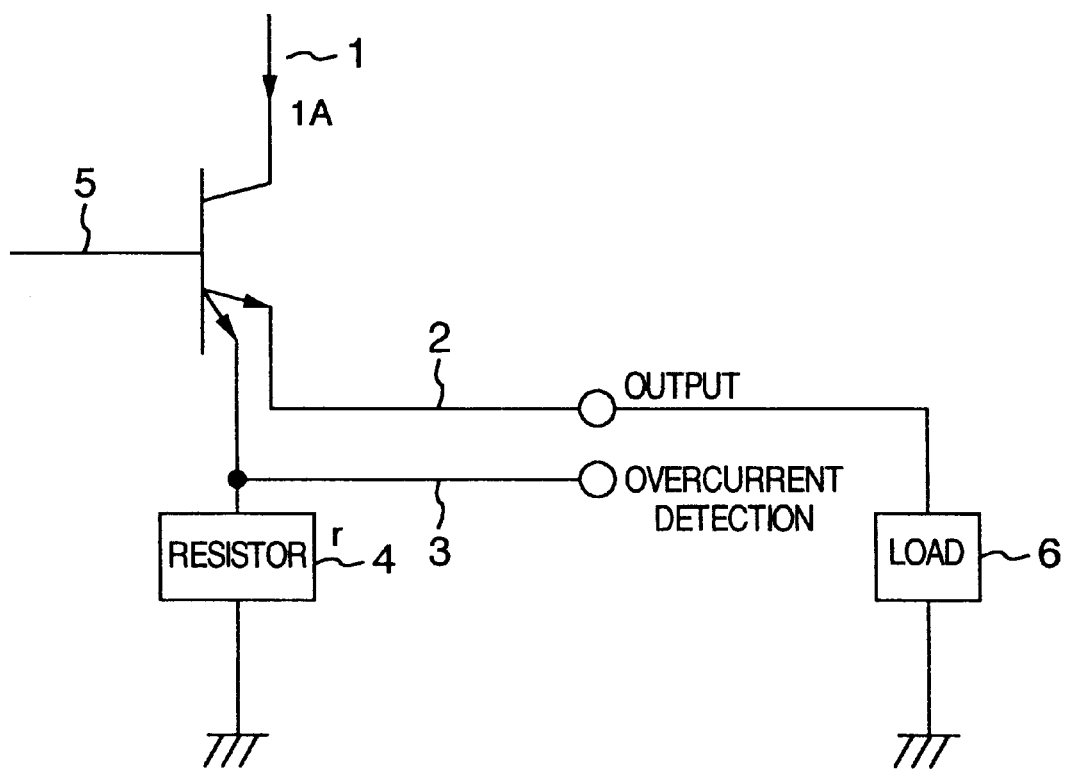
FIG. 2 is a circuit diagram of the background art.

FIG. 1 shows an output transistor circuit portion of the output module. When an input current flows into a conduction input signal 15, a base current flows into a base terminal 17 of an output transistor 14 from an output terminal 10a of a latch circuit 10 constituted by flip-flop circuit elements. When a load current 18 (IC) flows, a load 8 operates. The load current 18 passes through an overcurrent detection resistor 7 and flows into a collector C and goes out from an emitter E of the output transistor 14. At that time, a voltage 22 (VC) is generated between the opposite ends of the overcurrent detection resistor 7. This voltage is compared with a reference voltage 13 (Vref) in a comparator 12 so that an overcurrent is detected.

Figure 3:
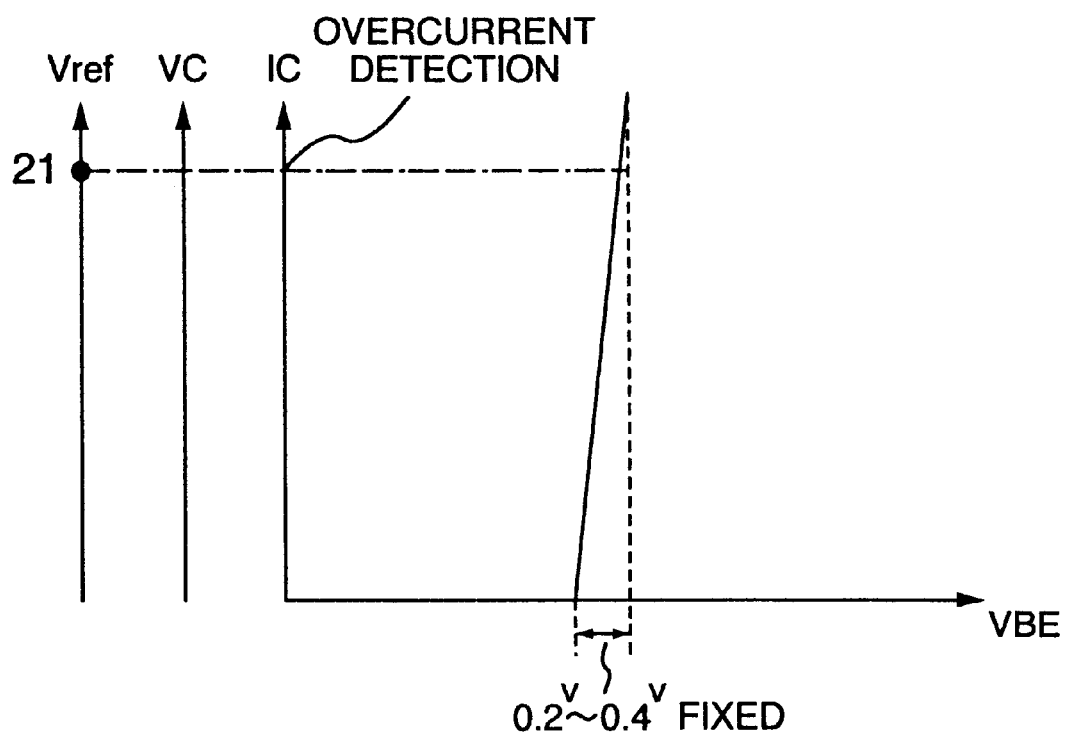
FIG. 3 is an overcurrent detection characteristic graph of the embodiment of the present invention.

Next, FIG. 3 shows an overcurrent detection characteristic graph of the present invention.

As shown in FIG. 3, a voltage VBE between the base B and the emitter E of the output transistor 14 is substantially fixed in a range of from 0.2 V to 0.4 V regardless of the current value of the load current 18. The value of a voltage applied to the positive terminal of the comparator 12 is expressed by (VC+VBE), but the deviation range of VBE is ignorably small in comparison with the value of VC when an overcurrent is detected. According to Ohm's law, a current flowing into a resistor is proportional to a voltage generated between the opposite ends of the resistor if the resistor has a fixed resistance value. This law is used for detection. The resistance value of the overcurrent detection resistor 7 is fixed while an overcurrent detection voltage 21 in FIG. 3 is established. Most of overcurrents are caused by a load short-circuit failure or the like. Accordingly, the output transistor can be protected if the resistance value of the overcurrent detection resistor 7 is established in such a manner that the current flowing into the overcurrent detection resistor 7 will be slightly larger than the maximum load current but not larger than the maximum peak current of the output transistor 14 when such a failure is produced.

When the voltage 22 (VC) which is larger than the reference voltage 13 connected to the comparator 12 is produced between the opposite ends of the overcurrent detection resistor 7, the output of the comparator 12 is turned ON so that the output of an AND gate 11 is turned OFF and the output of the latch circuit 10 is turned OFF. The output of the output terminal 10a of the latch circuit is turned OFF and the base current of the output transistor 14 is turned OFF. Accordingly, the load current 18 ceases flowing. Here, if the cause of the overcurrent of the load 8, for example, a short-circuit failure is eliminated, the voltage 22 generated between the opposite ends of the overcurrent detection resistor 7 becomes smaller than the reference voltage 13. The output of the comparator 12 is turned OFF so that the AND circuit 11 is turned ON to supply an output signal to a set terminal 10s. Because the output of the latch circuit 10 is turned ON, the base current flows into the output transistor 14 so that the output transistor 14 recovers automatically.

However, if the cause of the overcurrent of the load 8 is not eliminated, the voltage 22 generated between the opposite ends of the overcurrent detection resistor 7 is left larger than the reference voltage 13. The output of the comparator 12 is left ON so that the output of the latch circuit 10 is left OFF. Even if the input signal 15 is in ON state, the base current does not flow into the output transistor 14. Accordingly, the output transistor 14 keeps its interrupted state and does not restore its ON state at all.

In addition, as soon as the output of the latch circuit 10 is turned OFF, an output is produced in an output terminal 10b of the latch circuit so that an overcurrent indicator element 9 is turned ON. Thus, a user can be noticed that the output transistor has been interrupted due to an overcurrent, and the user can be urged to take a necessary measure.

Incidentally, a time constant circuit element may be inserted between the output terminal 10a of the latch circuit 10 and the base 17 of the output transistor 14 so as to judge whether a signal has continued for a predetermined time. Thus, the output transistor is not turned OFF unless an overcurrent has continued for a predetermined time. Similarly, a time constant circuit element may be inserted into the output terminal 10b.

With such a configuration, in a condition that an overcurrent is flowing, the cause of the overcurrent is not eliminated, and the input signal is in ON state, the output transistor can be automatically turned OFF, and at same time, the production of the overcurrent state can be showed to the user. On some occasions, the following process may be done. That is, the overcurrent state is first indicated, the cause of the overcurrent are eliminated, and then in accordance with the situation, the output transistor is turned ON or OFF.

Figure 4:
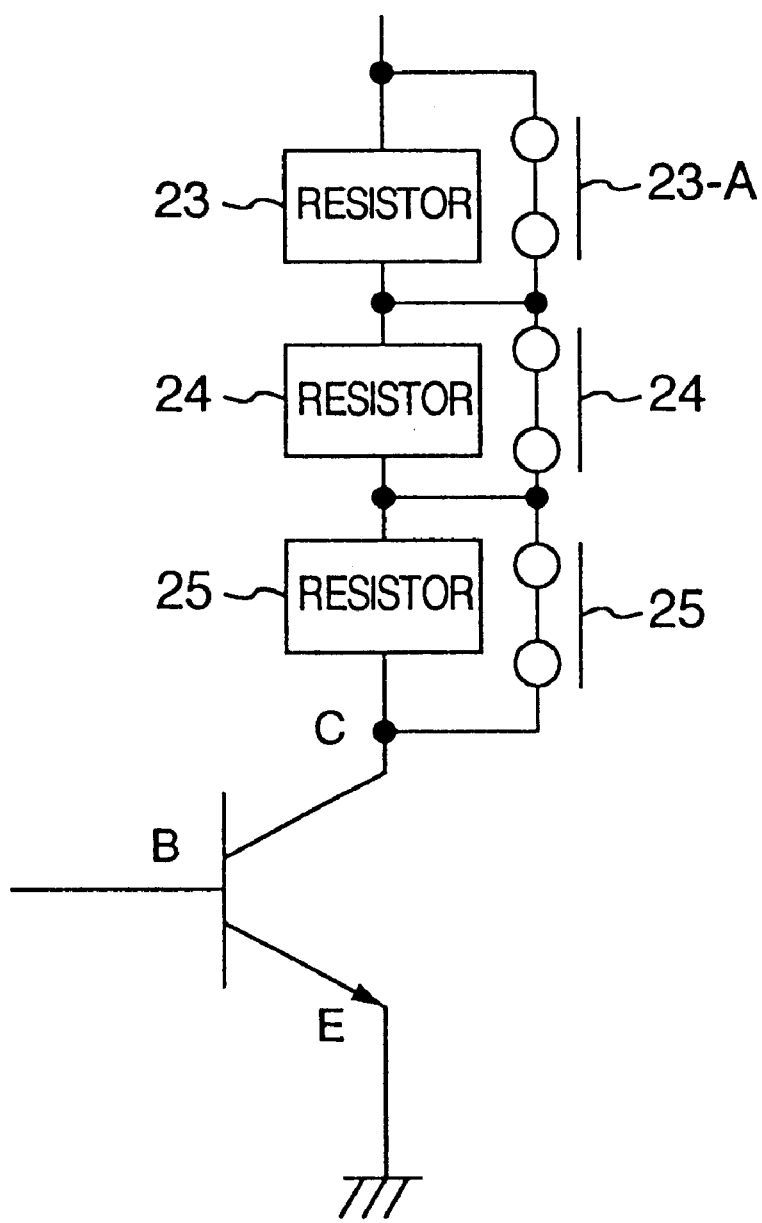
FIG. 4 is a diagram showing another embodiment of an overcurrent detection resistor for use in the embodiment of the present invention.

FIG. 4 shows a circuit, in more detail, for detecting a current value for detecting an overcurrent by the overcurrent detection resistor 7. In FIG. 4, an overcurrent detection resistor 23 is constituted by a unit resistor of $0.01\Omega$ and a switch 23-A connected in parallel with the unit resistor. An overcurrent detection resistor 24 is constituted by a unit resistor of $0.1\Omega$ and a switch 24-A connected in parallel with the unit resistor. An overcurrent detection resistor 25 is constituted by a unit resistor of $1\Omega$ and a switch 25-A connected in parallel with the unit resistor. The overcurrent resistors 23, 24 and 25 are connected in series with one another. Each of such unit resistors of $0.01\Omega$, $0.1\Omega$ and $1\Omega$ and switches may be used in plural numbers. Thus, a combined resistance can be established in units of $0.01\Omega$ if the switches 23-A, 24-A and 25-A are turned ON/OFF properly. The overcurrent detection value can be also established extremely precisely.

According to the present invention, in a condition that an overcurrent is flowing and the input signal is in ON state, the output transistor can be automatically turned OFF and, at the same time, the overcurrent state can be showed to the user.

What is claimed is:

1. A programmable controller comprising a power source module, a CPU module, an input module and an output module, an output circuit portion provided in said output module, a latch circuit constituted by a flip-flop circuit, a current detection portion for detecting a current flowing in said output circuit portion, a reference voltage variation portion to vary a reference voltage of a comparator circuit for comparing said reference voltage with a voltage of said current detection portion, an overcurrent control circuit portion for supplying an interruption signal to said output circuit portion when a detected current value exceeds a predetermined value, and an overcurrent indication portion for operating synchronously with said interruption signal, wherein said output circuit portion interrupts an overcurrent at the time of an overcurrent, said reference voltage variation portion varies continuously a value for overcurrent interruption, and the overcurrent interruption is indicated on said overcurrent indication portion.

2. A programmable controller comprising a power source module, a CPU module, an input module and an output module, an output transistor provided in said output module, a current detection portion provided in a load current path of said output transistor, a comparator circuit for comparing a voltage detected by said current detection portion with a reference voltage, a reference voltage variation portion to vary said reference voltage, a control circuit for interrupting current conduction of said output transistor when said comparator circuit generates an output at the time of presence of a signal instructing current conduction to said output transistor, and an overcurrent indication portion connected to said control circuit for indicating interruption of current conduction of said output transistor.

3. The programmable controller according to claim 2, further comprising a latch circuit constituted by a flip-flop circuit.

4. The programmable controller according to claim 2, wherein said reference voltage variation portion varies continuously a value for overcurrent interruption.

* * * * *